(12) United States Patent
Lovas et al.

(10) Patent No.: US 7,945,434 B2
(45) Date of Patent: May 17, 2011

(54) NON-INTRUSIVE EVENT CAPTURING FOR EVENT PROCESSING ANALYSIS

(75) Inventors: Louis R. Lovas, Hollis, NH (US); Fredric Cohen, Princeton Junction, NJ (US)

(73) Assignee: Progress Software Corporation, Bedford, MA (US)

( * ) Notice: Subject to any disclaimer, the term of this patent is extended or adjusted under 35 U.S.C. 154(b) by 553 days.

(21) Appl. No.: 12/053,016

(22) Filed: Mar. 21, 2008

(65) Prior Publication Data

US 2008/0243463 A1 Oct. 2, 2008

Related U.S. Application Data

(60) Provisional application No. 60/896,473, filed on Mar. 22, 2007.

(51) Int. Cl.
*G06G 7/62* (2006.01)
(52) U.S. Cl. .......................... 703/17; 702/186
(58) Field of Classification Search ............... 703/13, 703/17

See application file for complete search history.

(56) References Cited

U.S. PATENT DOCUMENTS

| | | | | |
|---|---|---|---|---|
| 5,515,502 A * | 5/1996 | Wood | | 714/15 |
| 6,367,034 B1 * | 4/2002 | Novik et al. | | 714/39 |
| 6,470,071 B1 * | 10/2002 | Baertsch et al. | | 378/62 |
| 6,611,724 B1 * | 8/2003 | Buda et al. | | 700/49 |
| 6,782,381 B2 | 8/2004 | Nelson et al. | | |
| 7,072,800 B1 * | 7/2006 | Fernandez et al. | | 702/186 |
| 7,483,810 B2 * | 1/2009 | Jackson et al. | | 702/176 |
| 7,725,508 B2 * | 5/2010 | Lawarence et al. | | 707/830 |
| 2002/0191952 A1 * | 12/2002 | Fiore et al. | | 386/46 |
| 2004/0034795 A1 * | 2/2004 | Anderson et al. | | 713/201 |
| 2007/0244571 A1 * | 10/2007 | Wilson et al. | | 700/11 |
| 2008/0004856 A1 * | 1/2008 | Avitzur et al. | | 703/17 |

OTHER PUBLICATIONS

Gyllstrom et al, "SASE: Complex Event Processing over Streams", 3rd Biennial Conference on Innovative Data Systems Research, Jan. 7-10, 2007.*
Greiner et al, "Business Activity Monitoring of norisbank Taking the Example of the Application easyCredit and the Future Adoption of Complex Event Processing (CEP)", Proceedings of the 4th International Symposium on Principles and Practice of Programming in Java, Aug. 2006.*
Apama EventStore 2.4—EventStore and Research Studio User Guide, © 2006, 105 pages.

* cited by examiner

*Primary Examiner* — Mary C Jacob
(74) *Attorney, Agent, or Firm* — Wilmer Cutler Pickering Hale and Dorr LLP (57) ABSTRACT

A system and a method for capturing, storing and replaying data describing application of an event-based process to an event are described. As an event processing engine processes an input event, specified data is captured by a store monitor included in the event processing engine. Hence, while the event processing engine processes an input event, data describing the event processing is contemporaneously captured without affecting processing of the input event. The captured data is then stored for later access and can be used later simulate or analyze the event processing. In one embodiment, the stored data is also classified or grouped based on one or more grouping criteria (e.g., event type, timestamp) to simplify later access to the data.

20 Claims, 7 Drawing Sheets

NON-INTRUSIVE EVENT CAPTURING FOR EVENT PROCESSING ANALYSIS

CROSS REFERENCE TO RELATED APPLICATIONS

This application claims priority, under 35 U.S.C. §119(e), from U.S. Provisional Application No. 60/896,473, filed Mar. 22, 2007, titled "Apparatus For The Capture And Replay Of Events, Preserving Time Series Order, To Be Used As A Testing And Replay Mechanism In A Complex Event Processing System," which is incorporated by reference herein in its entirety

BACKGROUND

1. Field of Art

The present invention generally relates to the field of event-based computer systems, and more specifically, to analyzing event-based computer systems by capturing data while the event-based system processes an event.

2. Description of the Related Art

Recently, the availability and amount of real-time information has significantly increased. This increased data availability has also increased the use of event-based computing, which allows for real-time monitoring, analysis and response to events. In event-based, or Complex Event Processing (CEP), systems, incoming or input events are monitored for pre-defined patterns and defined output actions are taken upon detecting a pattern. Because of this detection and response behavior, CEP systems are frequently used in applications which require proactive response to patterns in changing data, such as real-time algorithmic trading applications, risk assessment applications, compliance applications, telecommunication applications, digital battle applications, supply chain monitoring and terrorist tracking.

However, to accurately respond to changing event types or implementation environments, CEP systems need to be continually revised. Analyzing the historical performance of CEP systems increases the accuracy and effectiveness of these revisions. Accurate analysis of historical CEP system performance requires capturing, storing and replaying previously processed real-time events and metadata describing event processing. For example, metadata indicating input event arrival date and time needs to be preserved so the CEP analysis processes input events in the same sequence as the initial event processing. Hence, storing metadata describing event processing permits a subsequent, controlled, replay of the event processing to precisely simulate prior CEP system performance.

Often, large time spans, such as months or years, of previously processed events need to be analyzed to identify new or emerging event types or to evaluate overall CEP system performance. However, it is not practical to analyze a large quantity of data at the original arrival and/or processing rate. Replaying the stored data in a faster than wall clock fashion while maintaining the correct date and time sequence reduces analysis time without impairing accuracy. Hence, if the CEP system uses timers or other temporal calculations, the timers or other temporal calculations must also be accelerated to match the data replay rate to ensure that the CEP system has a uniform view of time for consistent operation.

However, existing methods for CEP system analysis require use of a bespoke-from-scratch development method, resulting in a long development cycle and a complex maintenance process for the CEP system.

SUMMARY

In an embodiment, the simulation manager specifies data for capturing, such as event types or a time period in which to capture events. An event processing engine is adapted to communicate with the simulation manager and receives the data specifying what data to capture. The event processing engine also applies an event-based process to the input event. In an embodiment, the event processing engine communicates with a store monitor which captures the data specified by the simulation manager while the event processing engine processes the input event. For example, the store monitor replicates the received input event and data generated or used by the event-based process in processing the input event. In an embodiment, an event store is adapted to communicate with the event processing engine and receives and stores the data captured by the store monitor. In one embodiment, the event store further processes the stored data, such as by classifying or grouping the data, to facilitate subsequent access to the captured data.

In one embodiment, the event processing engine comprises an event processor that receives an input event and processes the input event by applying an event-based process to the input event. A store monitor is adapted to communicate with the event processor and captures data describing how the input event is processed while the event processor processes the input event. In one embodiment, the event processing engine also includes an exchange simulator adapted to communicate with an event store which communicates data from the event store to the event processor. This allows the event processor to reprocess previously stored data. In an embodiment, the exchange simulator also modifies the stored data or the event-based process, allowing simulation of different events or application of different event-based processes.

In an embodiment, a simulation manager communicates data describing implementation of an event-based process, such as a description of the event-based process in an event processing language, to an event processing engine. The event processing engine then processes a received input event using the event-based process. While the input event is processed, data describing the event processing is captured by the store monitor without affecting processing of the input event and communicated to the event store. This allows data describing the event processing performance to be captured in real-time and subsequently analyzed without delaying or altering processing of the input event.

The features and advantages described in the specification are not all inclusive and, in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

A system and method for capturing, storing and replaying data describing processing of an input event by an event-based process are described. For purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

System Architecture

Figure 1:
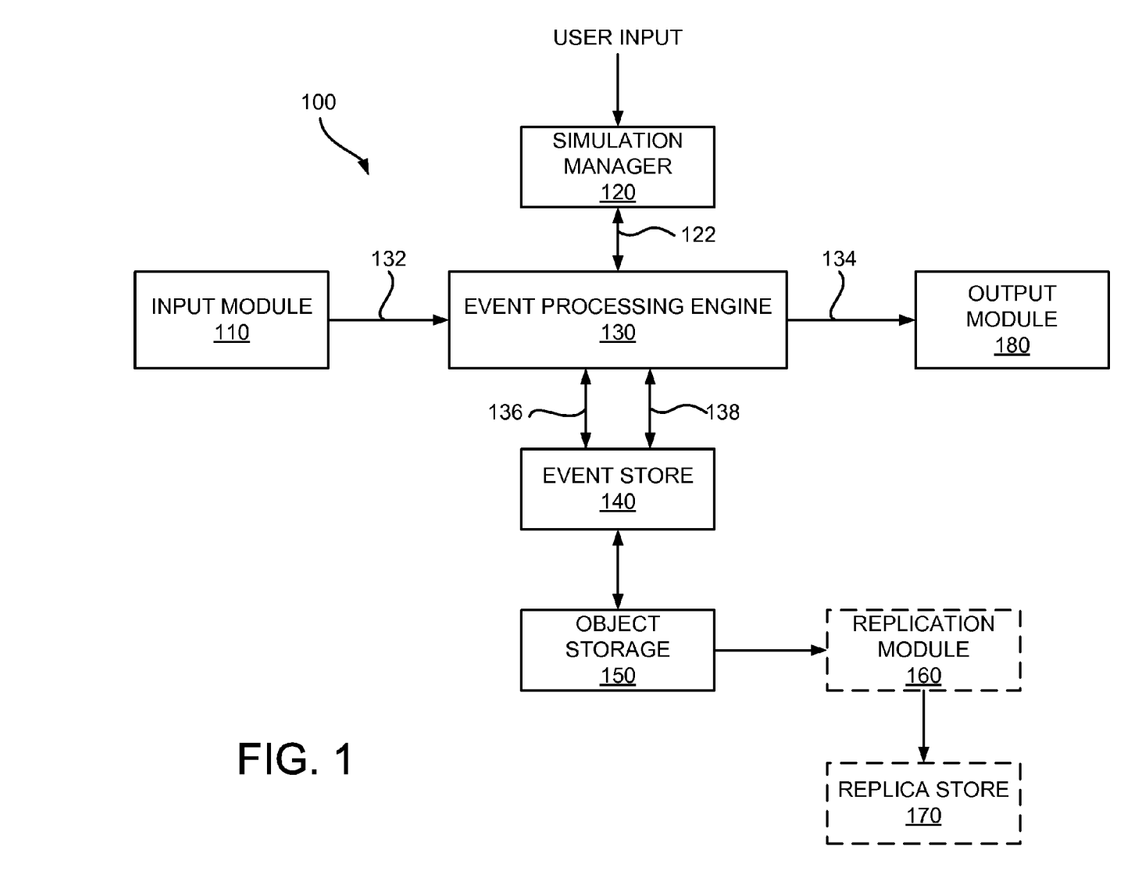
FIG. 1 is a block diagram of a system for analyzing an event-based process according to one embodiment of the invention.

FIG. 1 is a block diagram of an event processing system 100 according to one embodiment of the invention. The event processing system 100 comprises an input module 110, a simulation manager 120, an event processing engine 130, an event store 140, an object storage 150 and an output module 180. In an embodiment, the event processing system 100 also includes a replication module 160 and a replica store 170. In one embodiment, one or more of the input module 110, simulation manager 120, event processing engine 130, event store 140, object storage 150, replication module 160, replica store 170 and/or output module 180 communicate between each other using a network (not shown).

The input module 110 is a device or module configured to provide input events to the event processing engine 130. An output of the input module 110 is coupled by signal line 132 to an input of the event processing engine 130. In one embodiment, the input module 110 comprises an alphanumeric device, such as a QWERTY keyboard, a key pad, or representations of such created on a touch screen, adapted to communicate information and/or commands to the event processing engine 130. In another embodiment, the input module 110 is a user input device equipped to communicate positional data as well as command selections to the event processing engine 130 such as a cursor controller, a joystick, a mouse, a trackball, a stylus, a pen, a touch screen, cursor direction keys or other mechanisms to cause movement adjustment of an image. In yet another embodiment, the input module 110 comprises a device including computing capabilities and data communication capabilities that is adapted to communicate with the event processing engine 130. For example, the input module 110 communicates input events describing occurrences, such as an inventory level, a shipping delay or similar occurrence, to the event processing engine 130.

The simulation manager 120 is a device or module configured for controlling the capture of data during event processing, and controlling the simulation of event processing from stored data. The simulation manager 120 is coupled by signal line 122 to provide such control of the event processing engine 130 by sending simulation commands. The simulation manager 120 identifies stored data for simulating event processing of prior input events and/or configuring simulation parameters, such as simulation speed, time range of the simulation, modifications to the stored data prior to simulation or other suitable parameters for modifying the simulation. In the configuration of FIG. 1, the simulation manager 120 and the event processing engine 130 are separate devices. Using separate devices for the simulation manager 120 and the event processing engine 130 allows data capture and/or simulation configuration to be controlled from a location remote from the event processing engine 130. In contrast to the configuration shown in FIG. 1, in one embodiment, a single module implements the functionality of both the simulation manager 120 and the event processing engine 130. In one embodiment, the simulation manager 120 includes an input device, similar to those described above in conjunction with the input module 110, for receiving input from the user and communicating such input that can include information and/or commands to the event processing engine 130. In another embodiment, the simulation manager 120 comprises a device 700 described below in conjunction with FIG. 7, which includes computing capabilities and data communication capabilities for controlling what data is captured or for controlling event processing simulation performed by the event processing engine 130.

The event processing engine 130 receives input events on signal line 132 from the input module 110 and applies an event-based process to the input events. The event-based process evaluates received input events using one or more event processing rules and generates an output action responsive to the evaluation. The output action is provided on signal line 134 by the event processing engine 130 to the output module 180. In one embodiment, the event processing engine 130 also captures data describing how the event-based process is applied to an input event without delaying or otherwise affecting application of the event-based process to the input event. For example, the event processing engine 130 captures data describing the date and time event processing began, data describing the type of input event, data describing intermediate steps in the processing of an input event or other data relevant to event processing. In one embodiment, the event processing data is captured concurrently with processing of the input event, allowing data to be captured in real-time as an input event is being processed. The event processing engine 130 also includes a store monitor 220 (shown and described below in conjunction with FIG. 2). The store monitor 220 of the event processing engine 130 captures data describing processing of an input event by the event processing engine 130 and captures data describing the input event. In another embodiment, the event processing engine 130 modifies the event-based process responsive to input from the input module 110 or simulation manager 120. In other words, the event processing engine 130 is able to simulate processing by re-processing input events that have been stored in the event store 140. The event processing engine 130 is coupled for communication with the event store 140 by signal lines 136 and 138.

The event processing engine 130 can be implemented in many ways. For example, it is a software process executable by a processor (not shown) and/or a firmware application. The process and/or firmware can be configured to operate on a general purpose microprocessor or controller, a field programmable gate array (FPGA), an application specific integrated circuit (ASIC) or a combination thereof. In another embodiment, the event processing engine 130 comprises a processor configured to process data describing input events and may comprise various computing architectures including a complex instruction set computer (CISC) architecture, a reduced instruction set computer (RISC) architecture or an architecture implementing a combination of instruction sets. The event processing engine 130 can comprise a single processor or multiple processors. In yet another embodiment, the event processing engine 130 comprises multiple software or firmware processes running on a general purpose computer hardware device. For purposes of illustration, FIG. 1 shows the event processing system 100 as having a single event processing engine 130; however, in various embodiments, the event processing system 100 includes a plurality of event processing engines 130.

The event store 140 collects data captured by the event processing engine 130. The event store 140 is coupled for communication with the event processing engine 130 by signal lines 136 and 138. Data captured during event processing is communicated to the event store 140 which may also classify the data to facilitate subsequent retrieval. In one embodiment, the event store 140 uses a collector file to initially store captured data. In one embodiment, the event store 140 compares the captured data to one or more grouping criteria and classifies the captured data accordingly. For example, the event store 140 compares captured data to one or more event types and organizes the captured data so that captured data having the same event type is stored together. Additionally, the event store 140 examines a timestamp associated with the captured data and uses the timestamp data to store the captured data in an ordered sequence, such as a chronological sequence of events. In an embodiment, the event store 140 also communicates stored data to the event processing engine 130 to allow processing of previously stored input events, i.e., simulation.

The event store 140 comprises a non-volatile storage device, a volatile storage device or a combination of a non-volatile storage device and a volatile storage device. In one embodiment, the non-volatile storage device is a hard disk drive, a flash memory device or other persistent storage device; and the volatile storage device is a dynamic random access memory (DRAM), a static random access memory (SRAM) or another suitable memory device). Additionally, the event store 140 comprises a software process executable by a processor (not shown) and/or a firmware application configured to classify received data. The process and/or firmware can be configured to operate on a general purpose microprocessor or controller, a field programmable gate array (FPGA), an application specific integrated circuit (ASIC) or a combination thereof.

In one embodiment, the event store 140 uses a plurality of slots to store the captured data. In a slot, the captured data is organized based on a grouping criteria such as an event type or a timestamp associated with the captured data. For example, the captured data is examined for data or metadata specifying an event type, and classified by event type. For example, a field within the captured data includes an event type identifier or metadata associated with the captured data includes an event type identifier. The classified data is then sorted according to a timestamp associated with the captured data. In various embodiments, the timestamp specifies when the captured data was generated by event processing or specifies when the data was captured. Sorting the captured data by timestamp allows data to be stored in slots based on when the data was captured or generated. For example, a slot includes data captured during a specific time interval, such as an hour interval or a multiple hour interval. Storing data according to event timestamps allows the event store 140 to simplify later use of the stored data as input to an event processing simulation.

The object storage 150 is coupled for communication with the event store 140. The object storage 150 receives the captured and classified data from the event store 140 and archives the data for later retrieval. This provides access to captured data for later event processing analysis without using resources of the event store 140. This allows the event store 140 to capture and categorize new or additional data from the event processing engine 130. In one embodiment, the object storage 150 comprises a non-volatile storage device, a volatile storage device or a combination of volatile and non-volatile storage devices as described above in conjunction with the event store 140.

The output module 180 receives output actions from the event processing engine 130 on signal line 134 and displays electronic images and/or data corresponding to the received output actions. For example, the output module 180 comprises a light emitting diode (LED) display, liquid crystal display (LCD), cathode ray tube (CRT) display, or any other similarly equipped display device, screen or monitor. In one embodiment, output module 180 is equipped with a touch screen in which a touch-sensitive, transparent panel covers the screen of output module 180. In one embodiment, the output module 180 comprises a discrete device with computing capabilities and data communication capabilities. The output module 180 that is adapted to communicate with the event processing engine 130 and generate or display output responsive to data from the event processing engine 130. For example, the output module 180 receives an output action from the event processing engine 130, such as invoking a service, notifying a user, initiating a process or other similar action, and performs or executes the received output action.

In an embodiment, the event processing system 100 further comprises a replication module 160 and/or a replica store 170. The replication module 160 is coupled to the object storage 150 and the replica store 170. The replication module 160 generates a replica of the input event and event processing data included in the object storage 150. In an embodiment, one or more generated replicas are transmitted to a remote location, such as the replica store 170, for analysis or to establish a backup repository of the stored input event and event processing data. The replication module 160 comprises a software process executable by a processor (not shown) and/or a firmware application. The process and/or firmware can be configured to operate on one or more processors similar to those described above in conjunction with the event processing engine 130.

The replica store 170 receives a replica of the stored input event and/or event processing data generated by the replication module 160 and stores the replica. In one embodiment, the replica store 170 is remote from the replication module 160, so that a backup copy of the captured data is stored at a remote location or is accessible from a remote location, allowing remote analysis of event processing. In one embodiment, the replica store 170 comprises a non-volatile storage device, a volatile storage device or a combination of volatile and non-volatile storage devices as described above in conjunction with the event store 140.

In an embodiment, a network (not shown) is used to transmit data or instructions between the input module 110, simulation manager 120, event processing engine 130, event store 140, object storage 150, replication module 160, replica store 170 and/or output module 180. In one embodiment, the network comprises a local area network (LAN), a wide area network (WAN) or any other conventional wired data communication system, such as Ethernet, digital subscriber line (DSL), integrated services digital network (ISDN), or any other suitable wired communication system. The network may comprise a conventional wireless data communication system, for example, general packet radio service (GPRS), IEEE 802.11 (or WiFi), IEEE 802.16 (or WiMax), Bluetooth or any other suitable wireless communication system. In another embodiment, the network comprises a combination of a wired communication system and a wireless communication system. In another embodiment, the network is a peer-to-peer configuration where the input module 110, simulation manager 120, event processing engine 130, event store 140, object storage 150, replication module 160, replica store 170 and/or output module 180 directly communicate with each other.

For purposes of illustration, FIG. 1 shows the input module 110, simulation manager 120, event processing engine 130, event store 140, object storage 150, replication module 160, replica store 170 and/or output module 180 as discrete modules. However, in various embodiments, any or all of the above-described modules can be combined. This allows a single module to perform the functions of one or more of the above-described modules.

Figure 2:
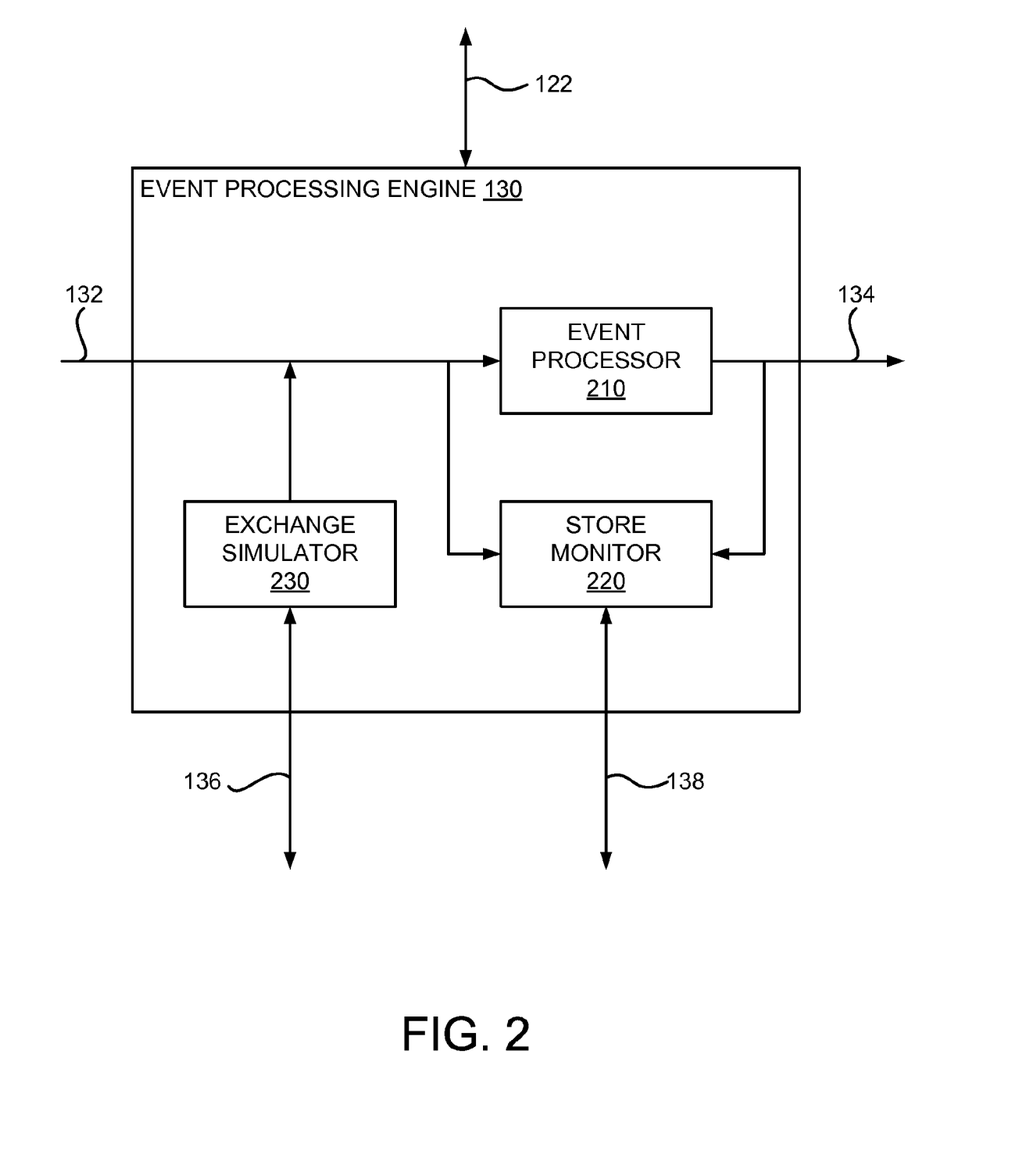
FIG. 2 is a block diagram of an event processing engine for processing an input event and for non-intrusively capturing data describing the event processing according to one embodiment of the invention.

FIG. 2 is a block diagram of an event processing engine 130 for processing an input event and for capturing data describing event processing according to one embodiment of the invention. The event processing engine 130 comprises an event processor 210, a store monitor 220 and an exchange simulator 230. Those of skill in the art will recognize that different embodiments can provide the functionality of FIG. 2 in different ways. Moreover, other embodiments can include different and/or additional features and/or components than the ones described here.

The event processor 210 applies an event-based process to received input events to determine a corresponding output action and may comprise various computing architectures including a complex instruction set computer (CISC) architecture, a reduced instruction set (RISC) architecture or an architecture implementing a combination of instruction sets. Although only a single event processor 210 is shown in FIG. 2, in some embodiments multiple event processors 210 are included. In one embodiment, the event processor 210 is an information appliance equipped to apply one or more event processing rules to a received input event and generate an output action based on application of the one or more event processing rules to the received input event. The event processor 210 has an input coupled to signal line 132 to receive input events and an output coupled to signal line 134 to provide output actions.

The store monitor 220 is adapted to communicate with the event processor 210 and captures data describing processing of the input event by the event processor 210. In particular, the store monitor 220 has an input coupled to signal line 132 to capture input events and a second input coupled to signal line 134 to capture output actions. This configuration allows the store monitor 220 to non-intrusively monitor and capture the event processing, in other words, without affecting the operation of the event processor 210. In one embodiment, the store monitor 220 generates a copy of data input to or produced by the event processor 210 without altering or delaying application of the event-based process to the received event. For example, the store monitor 220 captures multiple types of data, such as the input event, the event type, a timestamp indicating the time and/or date the input event was received by the event processing engine 130, a timestamp indicating the time and/or date when the captured data or output action was produced by the event processor 210, data modified by the event-based process, data describing the timing of the event processing, types of data generated by the event processing or other data associated with application of the event-based process to the received input event. In one embodiment, the store monitor 220 also compares data from the event processor 210 with stored information indicating data types and/or events to determine a subset of the event processing data to capture. Additionally, the store monitor 220 has an output to provide captured data. The output of the store monitor 220 is coupled to signal line 138 to communicate the captured data to the event store 140 for further processing. Although not shown, the store monitor 220 is coupled to receive control signals from the simulation manager 120 via signal line 122.

The store monitor 220 comprises a storage device, such as described above in conjunction with the event store 140, adapted to communicate with one or more internal processors (not shown). The internal processor executes a software process and/or a firmware application which compares data from the event processor 210 with information describing data types, time intervals or other data identifying data to be captured during event processing. In one embodiment, the internal processor is: a general purpose microprocessor which executes the software process and/or firmware application; a field programmable gate array (FPGA); an application specific integrated circuit (ASIC); or a combination of a general purpose microprocessor and an application specific or configurable microprocessor.

The exchange simulator 230 receives stored data and/or simulation parameters and communicates the data and/or simulation parameters to the event processor 210 so the event processor 210 processes the stored data to simulate processing of input events. In one embodiment, the exchange simulator 230 is coupled to signal line 132 to input data and/or simulation parameters to the event processor 210, and to signal line 136 to retrieve stored data and/or simulation parameters from the event store 140. In another embodiment, the exchange simulator 230 is coupled to the object storage 150 or the replica store 170 respectively to retrieve stored data and/or simulation parameters from them. In an embodiment, the exchange simulator 230 also modifies the stored data or the event-based process to simulate event processing using customized data or using a modified event-based process. Additionally in an embodiment, the rate at which the event processor 210 processes input events can be adjusted responsive to a signal from the simulation manager 120 on line 122. In concert and responsive to a signal from the simulation manager 120 on line 122, the exchange simulator 230 also modifies the rate at which input events are retrieved from the event store 140 and presented to the event processor 210. This effectively allows playback speed of the event simulation to occur faster or slower than real-time event processing. For example, responsive to input from the simulation manager 120, the exchange simulator 230 increases the rate at which data is communicated from the event store 140 to the event processor 210. This modification of data transfer rate to the event processor 210 decreases the time necessary for event processing simulation. The exchange simulator 230 advantageously can retrieve data and modify the retrieved data based on one or more configuration parameters to allow customization of the event-based processing simulation. Although not shown, the exchange simulator 230 is coupled to receive control signals from the simulation manager 120 via signal line 122.

The exchange simulator 230 comprises a process executable by a processor (not shown) and/or a firmware application. The process can be configured to operate on a general purpose microprocessor or controller, a field programmable gate array (FPGA), an application specific integrated circuit (ASIC) or a combination thereof. In an embodiment, the exchange simulator 230 comprises a processor configured to process data describing events which may comprise various computing architectures including a complex instruction set computer (CISC) architecture, a reduced instruction set computer (RISC) architecture or an architecture implementing a combination of instruction sets. The exchange simulator 230 can comprise a single processor or multiple processors. In an embodiment, the exchange simulator 230 comprises multiple software or firmware processes running on a general purpose computer hardware device.

For purposes of illustration, FIG. 2 shows the event processor 210, the store monitor 220 and the exchange simulator 230 as discrete modules. However, in various embodiments, any or all of the event processor 210, the store monitor 220 and/or the exchange simulator 230 can be combined. This allows a single module to perform the functions of one or more of the above-described modules.

Figure 7:
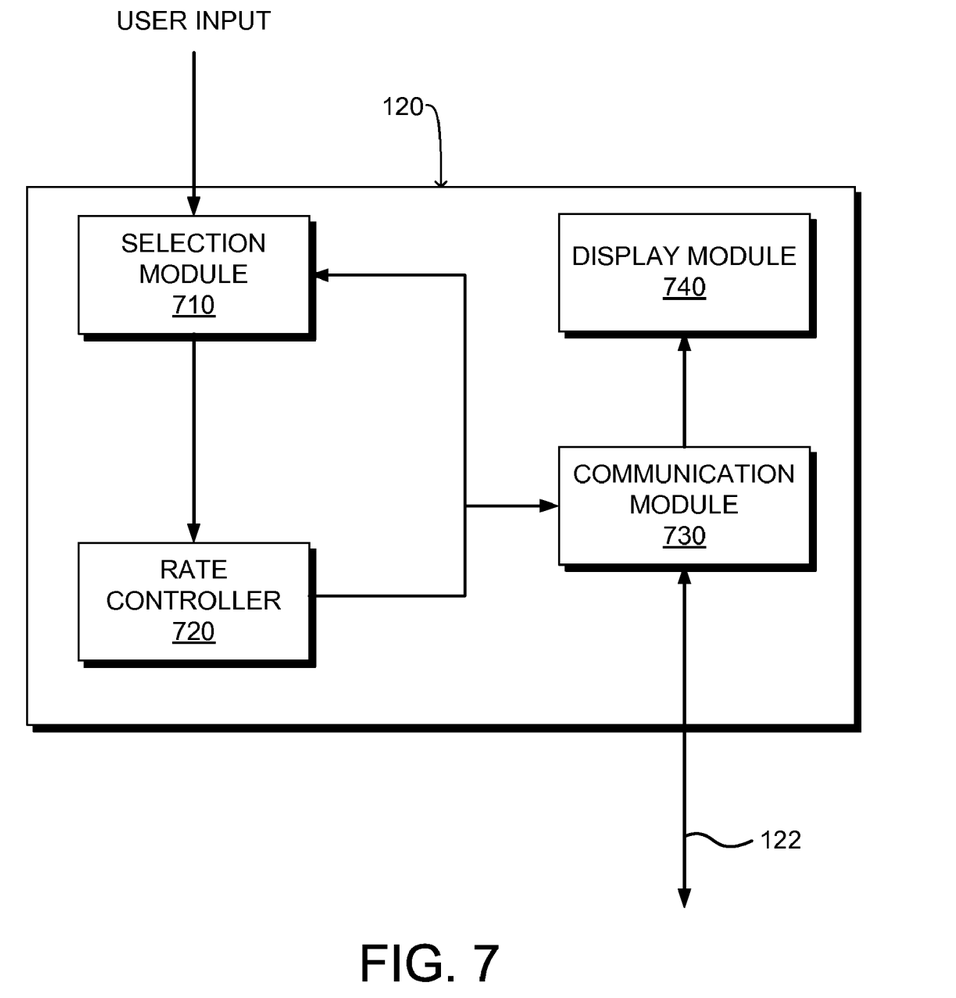
FIG. 7 is a block diagram of a simulation manager for controlling event processing data capture and for specifying data for event processing simulation according to one embodiment of the invention.

FIG. 7 shows an embodiment of the simulation manager 120 for controlling data capture and/or event processing simulation in more detail. The simulation manager 120 comprises a selection module 710, a rate controller 720, a communication module 730 and a display module 740. Those of skill in the art will recognize that other embodiments can provide the functionality of FIG. 7 in different ways. Moreover, other embodiments can include different and/or additional features and/or components than the ones described here.

The selection module 710 includes a device or module configured to input data and commands to the simulation manager 120 such as a cursor controller, a keyboard or representations of such, examples of which have been described above. The selection module 710 also includes routines or modules to specify types of data for capture during event processing, data used in a simulation or simulation parameters. The selection module 710 is coupled to the rate controller 720 and the communication module to communicate information and/or commands to the other components of the simulation manager 120.

The rate controller 720 receives an input from the selection module 710 and generates control signals to modify a data simulation rate which specifies how rapidly captured data is replayed during simulation. For example, if input from the selection module 710 increases the data simulation rate to process simulation data faster than the original data processing rate, the rate controller 720 generates and transmits a clock scale describing the data simulation rate to the event processing engine 130 via the communication module 730. The clock scale describing the data simulation rate is provided as a control signal to the event processor 210 and the exchange simulator 230 to produce adjustments in the processing rate and the rate at which data is retrieved, respectively. In one embodiment, the rate controller 720 also maintains the temporal order of captured data using timestamps associated with the captured data allowing the captured data to be processed in its originally received order when retrieved from the event store 140. Thus, the rate controller 720 determines how quickly an event-based process is simulated, allowing the event processing engine 130 to simulate event processing using captured data faster than real-time without altering the original processing order of the input events. In an embodiment, the rate controller 720 comprises one or more processors that execute a process and/or a firmware application to implement control of the simulation rate.

The communication module 730 is coupled to signal line 122 and links the simulation manager 120 to a network or any other interconnected data path across which multiple devices (not shown) may communicate, examples of which have been described above. The communication module 730 is also coupled to the selection module 710, the rate controller 720 and the display module 740. The communication module 730 couples the selection module 710, the rate controller 720 and the display module 740 to the event processing engine 130 for control of the event processor 210, the store monitor 220 and the exchange simulator 230. The communication module 730 transmits control signals from the simulation manager 120 to the event processing engine 130 that specify the data to be captured or previously captured data to be used in simulation.

The communication module 730 also receives from the event processing engine 130 data describing the processing of an input event, data describing the results of a simulation or results of data capture. In one embodiment, the communication module 730 provides a conventional wired connection, a conventional wireless connection or a combination of the two.

The display module 740 receives simulation or captured event processing data from the communication module 730 and displays electronic images and/or data corresponding to the received data. For example, the display module 740 comprises a display device, such as a light emitting diode (LED) display, a liquid crystal display (LCD), a cathode ray tube (CRT) display, or any other similarly equipped display device, screen or monitor. In another embodiment, the display module 740 comprises a discrete device including computing capabilities and data communication capabilities that is adapted to generate or display output responsive to data from the communication module 730. For example, the display module 740 displays data from the event store 140 or the event processing engine 130, such as results of an event processing simulation or data describing how an event was processed.

For purposes of illustration, FIG. 7 shows the selection module 710, the rate controller 720, the communication module 730 and the display module 740 as discrete modules. However, in various embodiments, any or all of the selection module 710, the rate controller 720, the communication module 730 and the display module 740 can be combined. This allows a single module to perform the functions of one or more of the above-described modules.

System Operation

Figure 3:
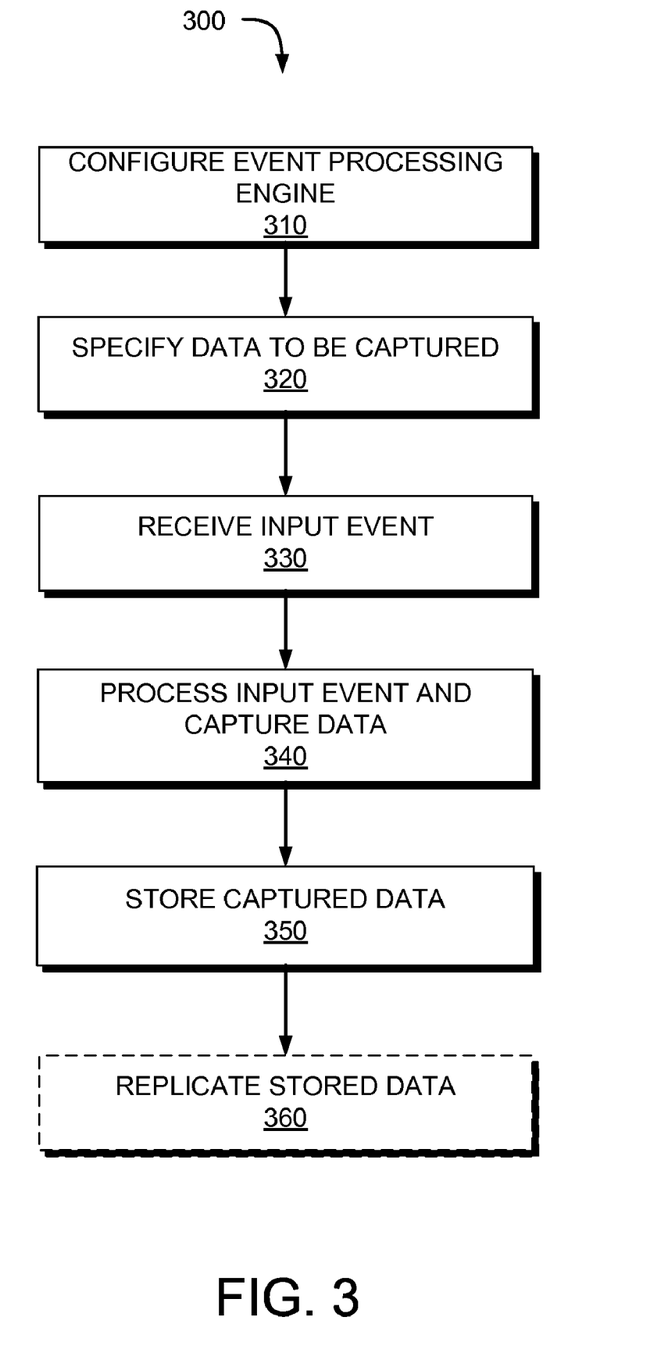
FIG. 3 is a flow chart of a method for non-intrusively capturing data describing event processing according to one embodiment of the invention.

FIG. 3 is a flow chart of a method 300 for non-intrusively capturing data describing event processing according to one embodiment of the invention. Those of skill in the art will recognize that other embodiments can perform the steps of FIG. 3 in different orders or include different and/or additional steps than the ones described herein.

Initially, the method begins by configuring 310 the event processing engine 130 with an event-based process. For example, the event processing engine 130 receives data, such as executable data or data in an event processing language format, describing the event-based process. The configuration 310 of the event processing engine 130 describes the event processing rules used to generate an output action corresponding to an input event. This configuration can be done by the simulation manager 120 or a configuration module (not shown).

After configuring 310 the event processing engine 130, the data to be captured is specified 320. Specifying 320 the data to be captured includes identifying the type, or types, of data to be captured from the event processing engine 130. In one embodiment, specifying 320 the data to be captured describes a set of event types for capture or a time period in which data is to be captured. For example, this may include configuring the event processing engine 130 to capture external events, such as input events received from the input module 110. As another example, the event processing engine 130 is configured to capture data produced by the event processing engine 130 during application of the event-based process to an input event. Other examples include output actions, states, variables, parameters and other information input to, output by or used in the event processing engine 130. However, the above descriptions of captured data are merely examples and in various embodiments specifying 320 the data to be captured identifies any suitable data associated with application of an event-based process for capturing.

The event processing engine 130 then receives 330 an input event. The input event is processed 340 using the event-based process and data describing application of the event-based process is captured during processing 340 of the input event. Data capture occurs as the input event is processed 340 and does not modify, delay or otherwise disrupt the event processing 340. In one embodiment, to capture data the event processor 210 generates a copy of event processing data and communicates the copy to the store monitor 220. In another embodiment, to capture data, the event processor 210 communicates data to the store monitor 220 which generates a copy of the received data for storage. This non-intrusive data capture allows data to be captured in real-time during event processing so the captured data precisely describes processing of an input event without modifying or altering event processing. This makes subsequent analysis or simulation of event processing more accurate by using actual data from processing of one or more input events. The captured data is then stored 350 for subsequent analysis or use in a simulation.

In one embodiment, the stored data is also replicated 360 to create one or more copies. Replication 360 allows a copy of the stored data to be backed up to a remote location, to a persistent storage device or to be archived for later retrieval, increasing security of the captured data. Additionally, replication 360 allows a copy of the stored data to be analyzed even while the event processing engine 130 processes additional input events, allowing processing of new input events to occur contemporaneously with analysis of prior event processing. Replicating 360 stored data also allows a remote device, rather than the event processing engine 130, to simulate or analyze event-based processing of prior events using the replicated data, conserving computing resources of the event processing engine 130.

Figure 4:
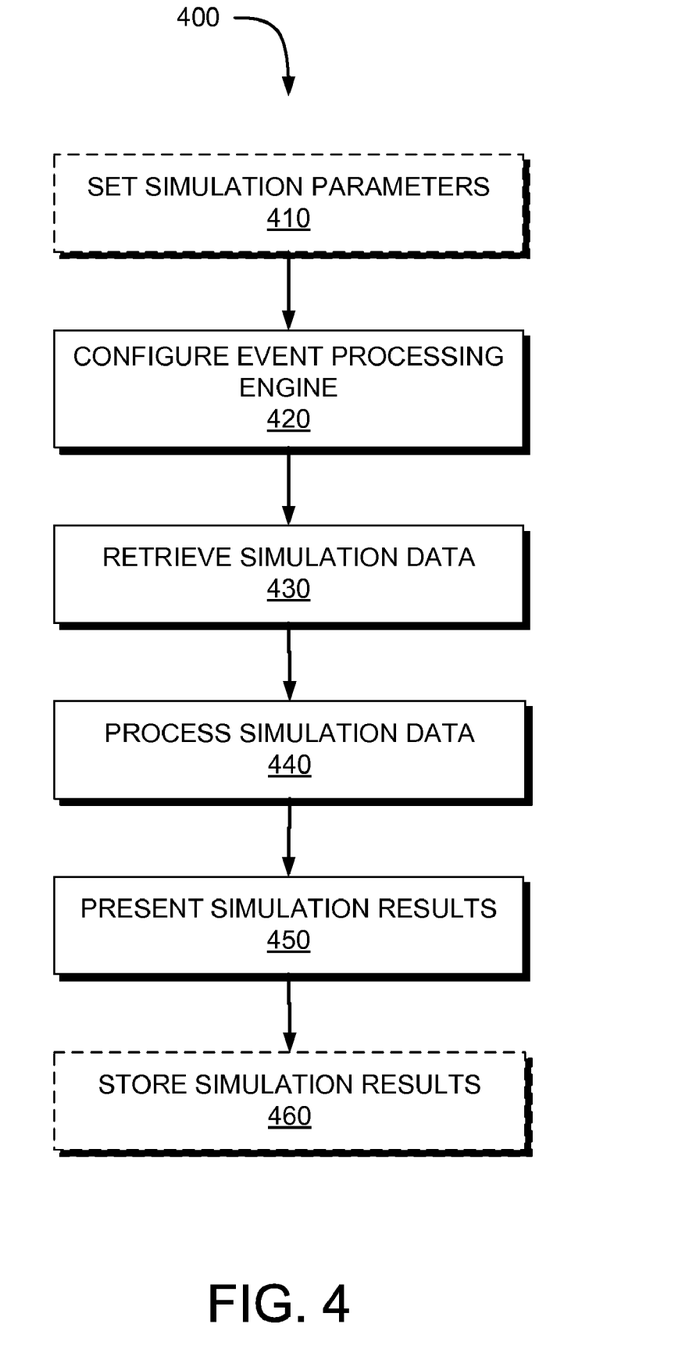
FIG. 4 is a flow chart of a method for simulating event processing using stored data according to one embodiment of the invention.

FIG. 4 is a flow chart of a method 400 for simulating event processing using stored data according to one embodiment of the invention. In an embodiment, data captured during prior processing of a prior event is used to subsequently simulate performance of an event-based process. Alternatively, the simulation data comprises user-specified data, allowing simulation of specific user-defined scenarios.

In one embodiment, one or more simulation parameters are set 410. The simulation parameters describe how data is processed during a simulation. For example, a configuration parameter modifies the playback speed of the simulation, allowing simulation of event processing faster or slower than real time. Such temporal management expedites examination of the final simulation results or slows simulation to allow analysis of individual processing steps. Another configuration parameter specifies a breakpoint where playback of event processing and/or data is stopped to allow analysis of data during a specific stage of event processing. Another configuration parameter specifies a subset or range of data for simulation, so that the event-based process simulation is used to analyze how specific data is processed. However, the above-described examples of simulation configuration parameters are merely examples, and in various embodiments the configuration parameters comprise any data associated with processing of data or input events.

The event processing engine 130 is then configured 420 to apply an event-based process to received data. For example, the event processing engine 130 receives data, such as executable data or data in an event processing language format, describing the event-based process to be simulated.

Simulation data is then retrieved 430. In one embodiment, the simulation data is retrieved 430 from the object storage 150. Alternatively, the simulation data is retrieved 430 from the replica store 170, allowing simulation using previously captured event processing data. In an embodiment, simulation data is modified from its stored value by the exchange simulator 230, allowing simulation to be customized for specific data or sequences of data. This modification allows simulation of how the event-based process responds to variations in received input events, or how modifications to the event-based process affect processing of existing data.

The retrieved simulation data is then processed 440 using the event-based process and the simulation results are presented 450 to a user. In one embodiment, the output module 180 presents 450 text and graphics describing simulation results to a user. Alternatively, the simulation results are presented 450 in a text-based report format for analysis. In yet another embodiment, the simulation manager 120 presents the results to the user on the display module 740. In still another embodiment, the processing 440 of the simulation data generates output actions that can then be provided 450 to other computing devices (not shown) for further processing in a manner similar to the original output action(s) generated by processing the original input event(s). The simulation results can also be stored 460 to permit subsequent examination of prior simulation results, or comparison of multiple simulation results to identify changes or trends in the event processing.

Figure 5:
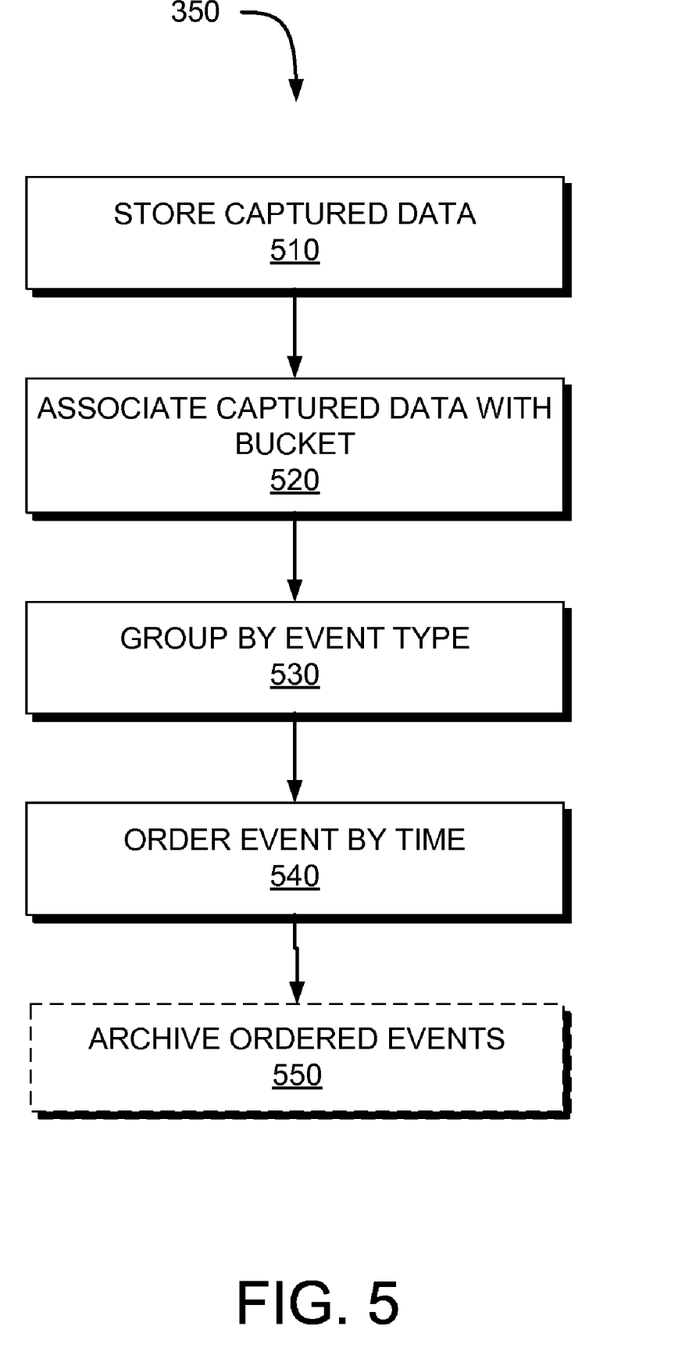
FIG. 5 is a flow chart of a method for storing data describing event processing according to one embodiment of the invention.

FIG. 5 is a flow chart of a method for storing 350 event processing data according to one embodiment of the invention. Those of skill in the art will recognize that other embodiments can perform the steps of FIG. 5 in different orders or include different and/or additional steps than the ones described herein.

A collector file is initially used to store 510 captured data to the event store 140. The collector file includes multiple types of data captured during event processing. In an embodiment, the collector file stores 510 the captured data without classifying, organizing or otherwise processing the captured data. While stored in the collector file, the captured data is accessible for analysis, but the captured data will be modified or stored to optimize subsequent retrieval of the captured data.

The captured data is then associated 520 with a slot based on the event type of the captured data. In one embodiment, a slot includes one or more different event types, so captured data is divided among a plurality of slots, which simplifies subsequent processing and retrieval of the captured data. For example, the captured data can be divided among 10 slots, where each slot is associated with two types of events. Data associated with a slot is then grouped 530 according to event type, so that different data is grouped based on type to allow for rapid retrieval of data having a similar event type. For example, data associated with a slot is grouped so that external input events are grouped 530 together and internal output actions which are generated by the event-based process when applied to an input event, are grouped 530 together.

After grouping 530 based on event type, data within a group is temporally ordered 540. For example, data in a group is ordered 540 by examining a timestamp indicating when the input event was received by the event processing engine 130 or indicating when the event processor 210 generated the captured data. Hence, data associated with a slot is first grouped 530 so that data having the same event type is stored in a group; data within each group is then ordered 540 by temporal criteria to generate a time ordered series of data associated with the processing of an event. This grouping 530 and ordering 540 simplifies subsequent retrieval of data based on when the data was generated by the event-based process.

In one embodiment, after the temporal ordering 540, the ordered series of data is archived 550. For example, a replica of the ordered series is generated and transmitted to a replica store 170, or similar persistent storage device, creating a backup copy of the data. Alternatively, a copy of the ordered series is transmitted to a remote device to remotely simulate a modified event-based process using the captured data or where the captured data is analyzed to evaluate the event processing.

Data Flow

Figure 6:
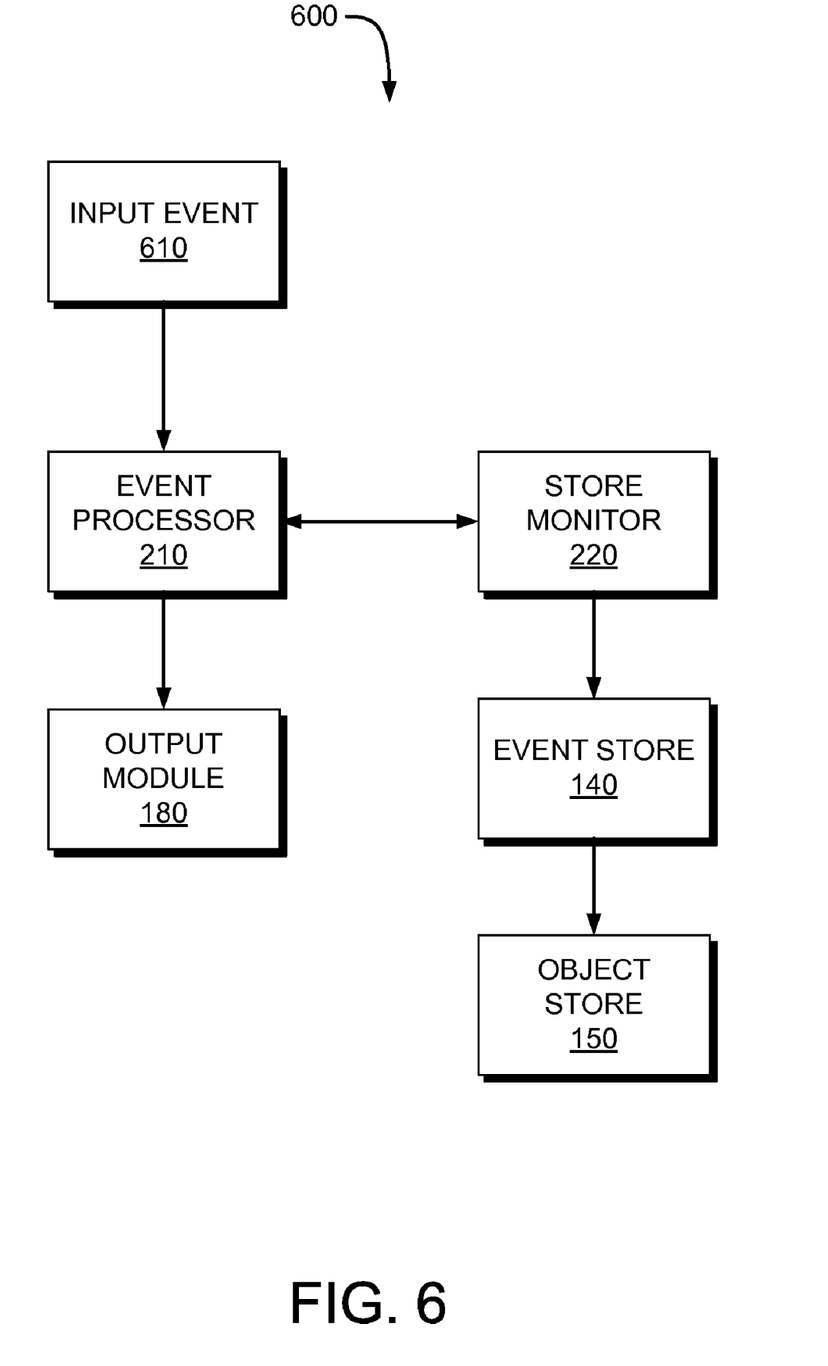
FIG. 6 is a data flow diagram of event processing and event processing data capture according to one embodiment of the invention.

FIG. 6 is a data flow diagram 600 of event processing and data capture according to one embodiment of the invention. The data flow diagram 600 shows one example of capturing data during event processing by an event processing engine 130 according to an embodiment of the invention.

Initially, an input event 610 is received by the event processing engine 130 and transmitted to the event processor 210. The store monitor 220 monitors the processing of the input event 610 by the event processor 210 and determines whether to capture data describing processing of the input event 610. In one embodiment, the store monitor 220 compares data describing processing of the input event 610 with stored data describing one or more characteristics of data to be captured. The store monitor 220 determines whether to capture event processing data concurrent with processing of the input event 610 by the event processor 210. If the store monitor 220 determines event processing data should be captured, the store monitor 220 captures data from the event processor 210 while the event 610 is processed without affecting processing of the input event 610. The captured data is sent from the store monitor 220 to the event store 140 for processing, such as classification, to facilitate later retrieval of the captured data. For example, the event store 140 organizes the captured data according to one or more parameters, such as event type, receipt time or any other parameter describing a characteristic of the captured data. The processed data is then transmitted to the object storage 150 where it is stored.

Concurrent with data capture, the event processor 210 processes the input event 610 to generate an output action. The output action is transmitted to the output module 180 for implementation or display. Hence, processing of the input event 610 by the event processor 210 is not delayed or otherwise affected by the data capture. This non-intrusive data capturing allows acquisition of data describing processing of "live" data, improving analysis and/or simulation of the event-based process without impairing real-time processing of input events.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for capturing data associated with an event-based process, the system comprising:
    a simulation manager for receiving an input specifying data associated with an event based process to capture and for sends a control signal to the event store to control retrieval of stored data from the event store and for communication of the stored data from an event store to an event processing engine for processing using the event-based process;
    the event processing engine, adapted to communicate with the simulation manager, for processing an input event using the event-based process;
    a store monitor, adapted to communicate with the event processing engine, for capturing data describing event processing contemporaneously with processing of the input event by the event processing engine; and
    the event store, adapted to communicate with the store monitor and the event processing engine, for receiving captured data describing event processing as stored data and for communicating the stored data to the event processing engine, and wherein the event store further modifies the stored data responsive to the control signal from the simulation manager and communicates the modified stored data to the event processing engine.

2. The system of claim 1, wherein the store monitor captures data describing event processing non-intrusively.

3. The system of claim 1, wherein the simulation manager is coupled to the event processing engine and the store monitor to provide a command for controlling data that is captured during event processing.

4. The system of claim 1, wherein the event store further organizes the stored data into one or more slots, where a slot includes stored data grouped by one or more grouping criteria.

5. The system of claim 4, wherein the grouping criteria comprises at least one from the group of an event type and a timestamp.

6. The system of claim 1, further comprising:
    an object storage, adapted to communicate with the event store, for archiving captured data.

7. The system of claim 6, comprising:
    a replication module, adapted to communicate with the object storage, for generating a replica of the archived captured data.

8. The system of claim 7, further comprising:
    a replica store, adapted to communicate with the replication module, for storing the replica of the archived captured data.

9. The system of claim 1, wherein the simulation manager includes a rate controller that modifies a rate at which stored data is communicated from the event store to the event processing engine.

10. An apparatus for capturing data associated with an event-based process comprising:
    an event processor for receiving an input event and for processing the input event using the event-based process;
    a store monitor adapted to communicate with the event processor, the store monitor for capturing the input event, for capturing data describing event processing contemporaneously with processing of the input event by the event processor and adapted to communicate with an event store and communicates the captured data describing event processing to the event store; and
    an exchange simulator adapted to communicate with the event processor and the event store, the exchange simulator for receiving captured data from the event store and transmitting the received captured data to the event processor, wherein the exchange simulator modifies the captured data received from the event store responsive to a control signal and transmits the modified data to the event processor.

11. The apparatus of claim 10, wherein the store monitor captures data describing event processing non-intrusively.

12. The apparatus of claim 10, wherein the event processor processes the received captured data using the event-based process.

13. The apparatus of claim 10, wherein the exchange simulator modifies the captured data received from the event store by performing one from the group of: altering a value included in the data received from the event store and altering a rate in which the modified data is transmitted to the event processor.

14. The apparatus of claim 10, wherein the exchange simulator modifies the event-based process and transmits a modified event-based process to the event processor.

15. A method for capturing data associated with an event-based process comprising:
    receiving an input event
    processing the input event using the event-based process;
    capturing the input event and data describing event processing contemporaneously with processing of the input event using the event based process;
    responsive to a simulation command, retrieving the captured input event and the captured data describing event processing;
    processing the retrieved captured input event and the retrieved captured data using the event-based process; and
    generating an output describing processing of the retrieved captured input event and the retrieved captured data, wherein retrieving the captured input event and the captured data comprises modifying the retrieved captured input event or the captured data describing event processing based upon the simulation command.

16. The method of claim 15, wherein processing the retrieved captured input event and the retrieved captured data using the event-based process is at least one from the group of: storing the captured input event and the captured data, and sending the captured input event and the captured data to an event store.

17. The method of claim 15, wherein processing the retrieved captured input event and the retrieved captured data using the event-based process includes storing the retrieved captured input event and the retrieved captured data, and the method comprises generating one or more replicas of the stored retrieved captured input event and the stored retrieved captured data.

18. The method of claim 15, wherein processing the retrieved captured input event and the retrieved captured data using the event-based process comprises:
  storing the retrieved captured input event and the retrieved captured data describing event processing;
  associating the retrieved captured input event and a subset of the retrieved captured data describing event processing with an event type; and
  associating the retrieved captured input event and the subset of the retrieved captured data with a timestamp indicating a capture time of the retrieved captured data.

19. The method of claim 18, further comprising:
  organizing the retrieved captured input event and the retrieved captured data describing event processing into a sequence based on the timestamp associated with the retrieved captured input event and the subset of the retrieved captured data.

20. The method of claim 15, further comprising:
  archiving the retrieved captured input event and the retrieved captured data describing event processing to a storage medium.

* * * * *